United States Patent Office 3,171,712
Patented Mar. 2, 1965

3,171,712
PREPARATION OF ALKALI METAL TRIBORO-
HYDRIDES
Lawrence J. Edwards, Zelienople, and William V. Hough,
Valencia, Pa., assignors to Callery Chemical Company,
Pittsburgh, Pa., a corporation of Pennsylvania
No Drawing. Filed July 18, 1957, Ser. No. 672,574
13 Claims. (Cl. 23—14)

This invention relates to the preparation of alkali metal triborohydrides.

The alkali metal triborohydrides and sodium triborohydride ($NaB_3H_8$) are described in our copending application Serial Number 572,265, filed March 19, 1956, now Patent No. 3,031,259, and also published in J. Am. Chem. Soc. 78, 689. The alkali metal triborohydrides because of their high content of hydridic hydrogen and because of their solubility in a variety of solvents in which the simple borohydrides ($MBH_4$) are not soluble are useful as reducing agents. For example, sodium triborohydride reduces acetone to isopropanol and nitro-benzene to azo-benzene as well as reducing other compounds which are reduced by sodium borohydride. Sodium triborohydride is also useful in the reduction of metal ions. Sodium triborohydride reduces most higher valence state metal ions to a lower valence state or to free metal, e.g., $Fe^{+++}$ to $Fe^{++}$, $Cu^+$ to Cu, $Ag^+$ to Ag.

Triborane(7) coordination compounds, $XB_3H_7$, are addition products of triborane(7) and a basic organic substituted hydride of a group VA or VIA element or a hydride of a group VA element, designated by X. Ethers, thioethers, amines, phosphines and ammonia are included in this group. The compounds and their preparation are described in detail in our copending application Serial Number 672,573, filed on even date herewith.

It is an object of this invention to provide a new and improved method for the preparation of alkali metal triborohydrides by the reaction of an alkali metal hydride or alkali metal borohydride with a triborane(7) coordination compound in an inert solvent for the triborane(7) coordination compound.

Another object is to provide a method for the preparation of alkali metal triborohydrides by the reaction of an alkali metal hydride or an alkali metal borohydride with tetraborane in moderately strong basic solvents such as ethers. Other objects of this invention will become apparent from time to time throughout this specification and claims as hereinafter related.

This invention is based upon the discovery that an alkali metal hydride such as sodium hydride or an alkali metal borohydride such as sodium borohydride will react with a coordination compound of triborane(7) with a basic organic substituted hydride of a group VA or VIA element or a hydride of a group VA element, to produce an alkali metal triborohydride according to the equation $$XB_3H_7 + MH \rightarrow MB_3H_8 + X$$

or $$XB_3H_7 + MBH_4 \rightarrow MB_3H_8 + X + \tfrac{1}{2}B_2H_6$$

where M is an alkali metal and X is the basic component of the triborane(7) coordination compound. This reaction takes place rapidly, produces the alkali metal triborohydride in much greater quantities than is possible using prior processes and produces a product substantially free from contaminating by-products. Base or other terms connoting basicity as used herein are relative terms in accord with common usage. It refers to the substances with capability to coordinate with $B_3H_7$ and it is believed that it is affected both by intramolecular effects and steric effects caused by molecular structures.

The following example illustrates the simple, uncomplicated process steps used to prepare the alkali metal triborohydrides by this invention. Tetrahydrofuran triborane(7), $C_4H_8OB_3H_7$, was prepared by condensing together 6.58 mmoles tetrahydrofuran and 6.48 mmoles tetraborane, $B_4H_{10}$, at $-196°$ C. The mixture was warmed to room temperature and 3.20 mmoles of diborane were removed, leaving 6.4 mmoles of tetrahydrofuran triborane(7) which contained a small amount of absorbed tetrahydrofuran. This solid triborane(7) coordination compound was dissolved in 6.4 mmoles of tetrahydrofuran, and 6.36 mmoles of sodium hydride (NaH) was added to the solution. This reaction mixture was stirred at room temperature for 1.75 hours. A total of 98% of the charged tetrahydrofuran (charged both as the coordination compound and solvent) was evaporated leaving a residue in the reactor which was identified by infra-red and X-ray examination and by elemental chemical analysis as sodium triborohydride. The yield of sodium triborohydride was quantitative based on the sodium hydride charged. Sodium triborohydride is also produced in quantitative yields when sodium borohydride is reacted with tetrahydrofuran triborane(7) in the same manner generally at a faster rate than the corresponding hydride.

It has been found that alkali metal hydrides and alkali metal borohydrides react to form the corresponding alkali metal triborohydride with any coordination compound of triborane(7) and such a base, e.g., ether triboranes such as diethylether triborane(7) and ethyleneglycoldimethylether triborane(7), amine triboranes such as trimethylamine triborane(7) and pyridine triborane(7), thioether triboranes(7) such as thiophene triborane(7), and phosphine triboranes such as trimethylphosphine triborane(7). The reaction proceeds satisfactory in any solvent for the triborane(7) coordination compound. It is generally more convenient, where possible, to use as a solvent the same base that is present as a component of the triborane(7) coordination compound since, in that case, no additional separation of solvent and the reaction generated base is required. Very strongly basic solvents such as the lower alkyl amines and cyclic amines, however, are not satisfactory solvents as they are not inert towards the triborane(7) coordination compounds. These solvents react with the triborane(7) coordination compound to form a variety of unidentified by-products thus reducing the yield of triborohydride. The solvent, of course, must be inert to the alkali metal hydride or alkali metal borohydride. For example, alcohols may be suitable solvents for the reaction of triborane(7) coordination compounds with alkali metal borohydrides but are not suitable for reactions with alkali metal hydrides because the alkali metal hydrides react vigorously with alcohols to produce hydrogen and the corresponding metal alcoholate. Ethers are satisfactory solvents for all reactions.

When ether solvents are used it has been found that it is not necessary to separately prepare the triborane(7) coordination compound, but that it can be prepared in situ from tetraborane. When an alkali metal hydride or alkali metal borohydride and tetraborane are contacted in an ether solvent the triborohydride is prepared by the two step reaction (1)  $B_4H_{10} + \text{ether} \rightarrow \text{ether } B_3H_7 + \tfrac{1}{2}B_2H_6$ and (2)  $MH + \text{ether } B_3H_7 \rightarrow MB_3H_8 + \text{ether}$ or (2a)  $MBH_4 + \text{ether } B_3H_7 \rightarrow MB_3H_8 + \text{ether} + \tfrac{1}{2}B_2H_6$ where M is an alkali metal. We find that most ethers are suitable solvents for this two step reaction, e.g., alkyl ethers such as diethyl ether and methyl propyl ether, cyclic ethers such as furan and tetrahydrofuran, and polyethers such as dioxane and ethyleneglycol diethyl ethers. Certain ethers, e.g., diphenyl ether, in which the ether functional group is blocked by large molecular structures, do not react with tetraborane to form the triborane(7) coordination compound because of steric effects and are thus not as suitable as solvents for reactions in which the triborane(7) coordination compound is formed in situ. The pressure and temperature at which the reaction is performed do not appear to be critical. It is generally preferred, however, to operate at below about 40 to 50° C., as at higher temperatures substantial decomposition of tetraborane occurs.

In a series of reactions, shown in Table I, sodium hydride was allowed to react with tetraborane in diethyl ether solution. Sodium hydride and a slight excess of tetraborane were added to diethyl ether in a sealed tube. The sealed tube contained the reactants and was maintained at room temperature for two hours. At the end of two hours the sealed tube was opened, the solution was recovered and the solvent evaporated therefrom. The solid residue which remained was a white solid which was proved by X-ray and infra-red analysis to be substantially pure sodium triborohydride. The yield obtained in this process is quantitative.

Table I

| Run No. | 1 | 2 |
| --- | --- | --- |
| Reaction Time (hours) | 2 | 2 |
| NaH charged (mmols) | 3.38 | 5.75 |
| $B_4H_{10}$ charged (mmols) | 9.00 | 10.42 |
| $NaB_3H_8$ recovered (mmols) | 3.38 | 5.75 |
| $B_4H_{10}$ recovered or accounted for in known side reactions (mmols) | 5.62 | 4.67 |

In another series of reactions, shown in Table II, sodium borohydride was allowed to react with tetraborane in diethyl ether solution. Sodium borohydride and a slight excess of tetraborane were added to diethyl ether in a sealed tube. The sealed tube containing the reactants was maintained at room temperature for five hours. At the end of the five hours, the sealed tube was opened, the solution recovered, and the solid evaporated therefrom. The solid residue which remained was a white solid and was shown by X-ray and infra-red analysis to be substantially pure sodium triborohydride, which was recovered in quantitative yields.

Table II

| Run No. | 1 | 2 |
| --- | --- | --- |
| Reaction Time (hours) | 5 | 5 |
| $NaBH_4$ charged (mmols) | 5.52 | 3.03 |
| $B_4H_{10}$ charged (mmols) | 10.45 | 6.06 |
| $NaB_3H_8$ recovered (mmols) | 5.52 | 3.03 |
| $B_4H_{10}$ recovered or accounted for in known side reactions (mmols) | 4.93 | 3.03 |

While this invention has been described with special emphasis upon the use of sodium hydride and sodium borohydride other alkali metal hydrides and alkali metal borohydrides may be used in similar reactions to produce the corresponding alkali metal triborohydride.

This application is a continuation-in-part of our application Serial Number 572,205, filed March 19, 1956, now Patent No. 2,955,911.

According to the provisions of the patent statutes, we have explained the principle of our invention and have described what we consider to be its best embodiment. However, we desire to have it understood, that within the scope of the appended claims, the invention may be practiced otherwise than as specifically described.

We claim:

1. That method of preparing alkali metal triborohydrides comprising the step of contacting a hydride selected from the group consisting of alkali metal hydrides and alkali metal borohydrides with a triborane(7) coordination compound in the presence of an inert solvent for the triborane(7) coordination compound and recovering the alkali metal triborohydride produced.

2. A method according to claim 1 in which the solvent is an ether.

3. A method according to claim 1 in which the triborane(7) coordination compound is an amine triborane(7).

4. A method according to claim 1 in which the triborane(7) coordination compound is an ether triborane.

5. A method according to claim 4 in which the triborane(7) coordination compound is tetrahydrofuran triborane(7) and the solvent is tetrahydrofuran.

6. A method according to claim 5 in which the hydride is sodium hydride.

7. That method of preparing an alkali metal triborohydride comprising the step of contacting a hydride selected from the group consisting of alkali metal hydrides and alkali metal borohydrides with tetraborane in the presence of an ether selected from the class consisting of alkyl ethers, cyclic ethers and polyethers and recovering the alkali metal triborohydride formed.

8. A method according to claim 7 in which the hydride is sodium hydride.

9. A method according to claim 13 in which the ether is diethyl ether.

10. A method according to claim 7 in which the ether is a cyclic ether.

11. A method according to claim 10 in which the ether is tetrahydrofuran.

12. That method of preparing sodium triborohydride comprising the step of contacting sodium hydride and tetraborane in diethyl ether and recovering the sodium triborohydride from the solution which is produced.

13. That method of preparing an alkali metal triborohydride comprising the step of reacting a hydride selected from the group consisting of alkali metal hydrides and alkali metal borohydrides with tetraborane in the presence of a lower dialkylether and recovering the alkali metal triborohydride formed.

References Cited in the file of this patent

UNITED STATES PATENTS

| 2,545,633 | Schlesinger et al. | Mar. 20, 1951 |
| 2,955,911 | Edwards et al. | Oct. 11, 1960 |

OTHER REFERENCES

Stock: "Hydrides of Boron and Silicon," 1933, page 138.

A. Stock: Hydrides of Boron and Silicon. Cornell University Press, Ithaca, N.Y. (1933), pp. 139–40.

Hough et al.: "Journal of the American Chemical Society," vol. 78, page 689 (February 5, 1956).

Sittig: "Sodium," 1956, pages 201, 214.

Metal Hydrides Inc., Sodium Hydride Bulletin 507A, page 1, par. 10.

Hurd: Chemistry of the Hydrides, John Wiley and Sons, Inc., New York, N.Y. (1952), page 85.

Hurd: "Chemistry of the Hydrides," New York, John Wiley and Sons, Inc., 1952, page 86.